United States Patent
Zhao et al.

(10) Patent No.: US 10,498,613 B2
(45) Date of Patent: Dec. 3, 2019

(54) METHOD AND APPARATUS FOR COORDINATING NETWORK

(71) Applicant: Huawei Technologies Co., Ltd., Shenzhen (CN)

(72) Inventors: Dong Zhao, Shenzhen (CN); Kai Zhang, Shenzhen (CN); Lan Zou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 365 days.

(21) Appl. No.: 14/610,568

(22) Filed: Jan. 30, 2015

(65) Prior Publication Data

US 2015/0149627 A1   May 28, 2015

Related U.S. Application Data

(63) Continuation of application No. PCT/CN2013/080073, filed on Jul. 25, 2013.

(30) Foreign Application Priority Data

Aug. 1, 2012 (CN) .......................... 2012 1 0271425

(51) Int. Cl.
*H04W 36/00* (2009.01)
*H04L 12/26* (2006.01)
(Continued)

(52) U.S. Cl.
CPC .......... *H04L 43/04* (2013.01); *H04L 41/0886* (2013.01); *H04W 36/0061* (2013.01);
(Continued)

(58) Field of Classification Search
None
See application file for complete search history.

(56) References Cited

U.S. PATENT DOCUMENTS 8,630,648 B2 * 1/2014 Rune ................... H04J 11/0093
455/438
8,649,791 B1 * 2/2014 Wohld ............ H04W 36/00835
455/446
(Continued)

FOREIGN PATENT DOCUMENTS

CN 101119308 A 2/2008
CN 101964985 A 2/2011
(Continued)

OTHER PUBLICATIONS

Socrates, "Framework for the development of self-organisation methods", Sep. 3, 2008.*
(Continued)

*Primary Examiner* — Shirley X Zhang
(74) *Attorney, Agent, or Firm* — Leydig, Voit & Mayer, Ltd.

(57) ABSTRACT

Embodiments of the present invention relate to a method and an apparatus for coordinating a network. The method includes: receiving or monitoring network information; determining, according to the network information, whether a network operation needs to be coordinated; and coordinating the network operation if determining, according to the network information, that the network operation needs to be coordinated. The apparatus provided in embodiments of the present invention includes: a network information acquiring unit, a coordination determining unit and a coordinating unit. The method and the apparatus for coordinating the network provided in embodiments of the present invention can reduce the probability of occurrence of various network problems due to that a network operation is fixed or is preset by an operator, so that the network operation can achieve an expected network objective, thereby reducing maintenance cost of the operator.

18 Claims, 5 Drawing Sheets

(51) Int. Cl.
*H04L 12/24* (2006.01)
*H04W 24/02* (2009.01)

(52) U.S. Cl.
CPC ..... *H04W 36/0083* (2013.01); *H04L 41/0816* (2013.01); *H04L 41/0873* (2013.01); *H04W 24/02* (2013.01)

(56) References Cited

U.S. PATENT DOCUMENTS

| | | | | |
|---|---|---|---|---|
| 8,676,186 | B2* | 3/2014 | Niu | H04L 43/0882 455/422.1 |
| 8,838,090 | B2* | 9/2014 | Gunnarsson | H04W 24/02 455/415 |
| 8,958,812 | B2* | 2/2015 | Weiguo | 455/422.1 |
| 8,983,453 | B1* | 3/2015 | On | H04W 24/02 370/252 |
| 9,049,627 | B2* | 6/2015 | Teyeb | H04W 36/0061 |
| 2009/0047956 | A1* | 2/2009 | Moe | H04J 11/0093 455/436 |
| 2009/0325625 | A1 | 12/2009 | Hugl et al. | |
| 2010/0311407 | A1 | 12/2010 | Yao et al. | |
| 2011/0151886 | A1 | 6/2011 | Grayson et al. | |
| 2012/0066377 | A1* | 3/2012 | Li | H04L 12/24 709/224 |
| 2012/0213057 | A1* | 8/2012 | Zhang | H04W 24/02 370/216 |
| 2012/0275315 | A1* | 11/2012 | Schlangen | H04W 24/02 370/242 |
| 2013/0007275 | A1* | 1/2013 | Li | H04L 43/04 709/224 |
| 2013/0244668 | A1* | 9/2013 | Eckhardt | H04W 16/02 455/446 |
| 2013/0279368 | A1* | 10/2013 | Chou | H04W 4/06 370/254 |

FOREIGN PATENT DOCUMENTS

| | | |
|---|---|---|
| CN | 102056206 A | 5/2011 |
| CN | 102056336 A | 5/2011 |
| EP | 2453691 A1 | 5/2012 |

OTHER PUBLICATIONS

"3$^{rd}$ Generation Partnership Project; Technical Specification Group Services and System Aspects; Telecommunications Management; Self-Organizing Networks(SON)Policy Network Resource Model(NRM)Integration Reference Point(IRP); Requirements (Release 9)," 3GPP TS 32.521, V2.0.0, pp. 1-24, 3$^{rd}$ Generation Partnership Project, Valbonne, France (Mar. 2010).

Schmelz et al., "A Coordination Framework for Self-Organisation in LTE Networks," 12$^{th}$ IFIP/IEEE International Symposium on Integrated Network Management, pp. 193-200, Institute of Electrical and Electronics Engineers, New York, New York (2011).

Bandh et al., "Policy-based Coordination and Management of SON Functions," 12$^{th}$ IFIP/IEEE International Symposium on Integrated Network Management, pp. 827-840, Institute of Electrical and Electronics Engineers, New York, New York (2011).

"3$^{rd}$ Generation Partnership Project; Technical Specification Group Services and System Aspects; Telecommunication Management; Evolved Universal Terrestrial Radio Access Network (E-UTRAN) Network Resource Model (NRM) Integration Reference Point (IRP); Information Service (IS) (Release 11)," 3GPP TS 32.762, V11.2.0, pp. 1-55, 3$^{rd}$ Generation Partnership Project, Valbonne, France (Jun. 2012).

"3$^{rd}$ Generation Partnership Project; Technical Specification Group Services and System Aspects; Telecommunication Management; Trace Management Integration Reference Point (IRP); Information Service (IS) (Release 11)," 3GPP TS 32.442, V11.3.0, pp. 1-28, 3$^{rd}$ Generation Partnership Project, Valbonne, France (Jun. 2012).

"3$^{rd}$ Generation Partnership Project; Technical Specification Group Services and System Aspects; Telecommunication Management; Subscriber and Equipment Trace; Trace Control and Configuration Management (Release 11)," 3GPP TS 32.422, V11.4.0, pp. 1-122, 3$^{rd}$ Generation Partnership Project, Valbonne, France (Jun. 2012).

* cited by examiner

US 10,498,613 B2

METHOD AND APPARATUS FOR COORDINATING NETWORK

CROSS-REFERENCE TO RELATED APPLICATIONS

This application is a continuation of International Patent Application No. PCT/CN2013/080073, filed on Jul. 25 2013, which claims priority to Chinese Patent Application No. 201210271425.7, filed on Aug. 1, 2012, all of which are hereby incorporated by reference in their entireties.

TECHNICAL FIELD

The present invention relates to the field of communications, and more particularly, to a method and an apparatus for coordinating a network.

BACKGROUND

When different network operations achieve various network functions in existing communication networks, multiple network operations are fixed, or it is fixed among multiple network operations. For example, when mutual invoking and invoking sequence of the network operations, or the network operations are preset by an operator, various network problems (such as conflict of multiple network operations) often occur, so that an expected network objective, such as a key performance indicator (KPI) always cannot be achieved in the automation of the network planning, deployment, optimizing and maintenance phase, and cost of network maintenance is increased.

SUMMARY

Embodiments of the present invention provide a method and an apparatus for coordinating a network, so that the probability of occurrence of various network problems due to that a network operation is fixed is reduced in the automation of the network planning, deployment, optimizing and maintenance phase.

In one aspect, an embodiment of the present invention provides a method for coordinating a network, including:
 receiving or monitoring network information;
 determining, according to the network information, whether a network operation needs to be coordinated; and
 coordinating the network operation if determining, according to the network information, that the network operation needs to be coordinated.

In another aspect, an embodiment of the present invention provides an apparatus for coordinating a network, including:
 a network information acquiring unit, configured to receive or monitor network information;
 a coordination determining unit, configured to determine, according to the network information, whether a network operation needs to be coordinated; and
 a coordinating unit, configured to coordinate the network operation if the coordination determining unit determines, according to the network information, that the network operation needs to be coordinated.

The technical solutions provided in embodiments of the present invention can avoid the probability of occurrence of various network problems due to that a network operation is fixed or is preset by an operator, so as to achieve an expected network objective, thereby reduce cost of network maintenance, and improve efficiency of the network maintenance.

BRIEF DESCRIPTION OF DRAWINGS

FIG. 3-1 and FIG. 3-2 are schematic flow charts of a method for coordinating a network according to an embodiment of another aspect of the present invention.

DESCRIPTION OF EMBODIMENTS

Figure 1:
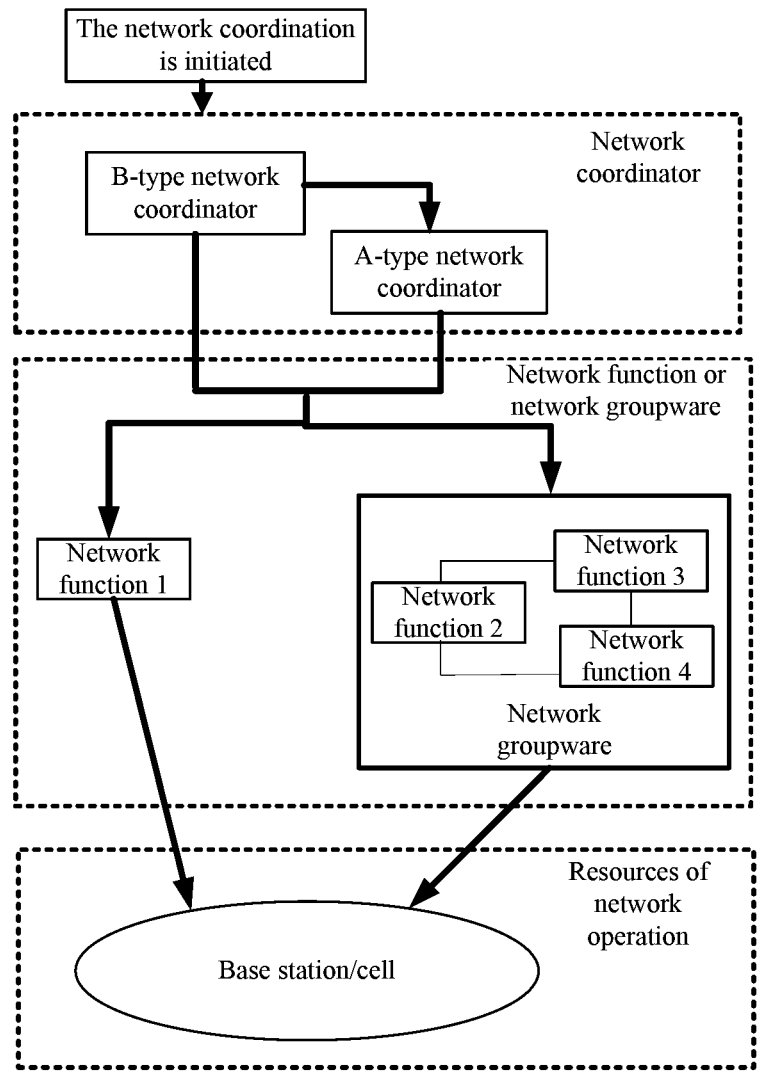
FIG. 1 is a schematic diagram of system architecture according to an embodiment of the present invention.

The technical solutions of the present invention will be further described in detail with reference to the accompanying drawings and embodiments.

In order to achieve the automation of the network planning, deployment, optimizing and maintenance phase, a self-organized network (SON) is introduced in embodiments of the present invention. For the purposes of clarity and completeness of embodiments of the present invention, SON is taken as an example in embodiments of the present invention, but persons skilled in the art should understand that embodiments of the present invention are not limited to SON, but for example, embodiments of the present invention also can be applied to network operations in a computer network and any network operation in a wireless communication network.

Hereinafter, some concepts and terminologies in embodiments of the present invention are defined and explained first.

In embodiments of the present invention, a network function can be, such as an SON function. Correspondingly, a network groupware includes an SON groupware. Correspondingly, a network operation includes an SON operation.

The network function, such as an SON function, has a function of achieving different expected network objectives. The network groupware includes a groupware consisting of network functions with fixed coordination relationship, for example, a SON groupware can include fixed invoking or fixed invoking sequence of the SON function and etc. Here, it should be noted that, the fixed relationship (such as invoking or invoking sequence of the SON function) of the SON groupware generally will not vary with a network scenario. A typical SON groupware can be, such as invoking ANR after COC; invoking COC after energy saving (ES), then invoking ANR; invoking MLB after MRO optimization. Generally, the combination of these SON functions forms corresponding SON groupware, which are configured by a network during deployment of the network. Generally, the fixed relationship of the SON groupware can be fixedly configured by an operator or a supplier in a form of a strategy, i.e., pre-configuration. The relationship of the SON groupware can be saved in a network element or a network manager, and the network manager can be an integration reference point manager (IRPManager), or an integration reference point agent (IRPAgent). The IRPManager can be an operator network management system (NMS), and the IRPAgent can be a supplier network management system (EMS).

The network operation (such as an SON operation) in embodiments of the present invention is a process of achieving a network function (such as an SON function) or a network groupware (such as an SON groupware) consisting of network functions with fixed coordination relationship.

In embodiments of the present invention, collaborative invoking between different network functions (such as SON functions), sharing and transferring of relevant data during the invoking, or the like all can be referred to as the coordination of the network operation.

Different network operations (such as SON operations) have different independent functions, which include, but not limited to, cell outage compensation (COC), coverage and capacity optimization (CCO), automatic neighbor relationship (ANR), mobility robust optimization (MRO), mobility load balance (MLB), and so on.

FIG. 1 is a schematic diagram of system architecture according to an embodiment of the present invention.

An entity in the schematic diagram of system architecture is a network coordinator, such as an SON coordinator. The network coordinator can be stand-alone in various network elements or network management systems, or can be within various network elements or network management systems. For example, the network coordinator can be located in a network element, or an IRPManager, or an IRPAgent, and the IRPManager and IRPAgent transfer information via a northbound interface.

The network coordinator can schedule different network functions or network groupwares to achieve different network objectives.

As an example, the network coordinator can determine which network function or network groupware to be invoked, and which network function or network groupware to be invoked first, which network function or network groupware to be invoked later. The network coordinator also can customize different network groupwares according to different network objectives, and the customized network groupwares can be a recombination of network functions, or can be a recombination of mutual invoking or invoking sequence of the network functions. For example, when a network failure occurs, the network coordinator can establish a set of coordination architectures for analyzing/troubleshooting in terms of the troubleshooting, and automatically eliminate the network failure after collecting network information, judging a root cause of the problem in a certain order, and arbitrating invoking relationship among multiple network functions or network groupwares. In addition, the network coordinator also can make the preference of different network functions or network groupwares of achieving the same network objective, monitor KPI change, save configuration parameters of network environments and performance measurement values under different network environments, roll back the network, initiate or terminate network functions or network groupwares, and so on. The network coordinator also can monitor which network functions or network groupwares have changed base stations or cells during the operation and how many base stations or cells are changed, which parameters of these base stations or cells have been modified, what are the requirements for initiating certain network functions or network groupwares, or the like. For example, the network coordinator can initiate and notify ANR relevant information, add a new cell or update neighbor relationship of a deleted cell, thus effectively preventing damage of service quality caused by waiting delay, and reducing computing load of a base station. For example, the network coordinator also can notify a CIO value of the MLB after MRO optimization, so that the MLB can perform optimization adjustment according to the newly-modified CIO value. For example, the cells or the base stations which are optimized through MRO optimization have their CIO modified, and the network coordinator notifies the MLB of these cells or base stations, so that the cells or the base stations within corresponding range can be adjusted, while incoherent area will not be re-adjusted.

The network coordinator in FIG. 1 includes a B-type network coordinator and an A-type network coordinator. In particular, the B-type network coordinator can analyze network conditions, recombine the relationship of different network functions (such as network function 1) or network groupwares (such as, consisting of network function 2, network function 3 and network function 4). After the network coordination is initiated, the B-type network coordinator is a higher layer network coordinating unit, and thus also can be called an upper layer network coordinator. The lower layer of the B-type network coordinator can be the A-type network coordinator, or network function or network groupware. Generally, the A-type network coordinator can independently configure the network function and the network groupware, to complete their respective network objectives. However, if there is the B-type network coordinator, the B-type network coordinator needs to perform collaborative operations, and the collaborative operations include invoking of network functions or network groupwares, invoking sequence, parameter transferring, waiting duration, mutex in case of conflict, KPI guarantee, and etc. The network functions or network groupwares scheduled by the A-type network coordinator are also uniformly scheduled by the B-type network coordinator, and the network configuration cannot be modified freely. Therefore, this coordination mode is called a centralized coordination mode. Correspondingly, when there is only the A-type network coordinator without the B-type network coordinator, the A-type network coordinator can freely modify the network configuration to satisfy respective network objectives, and such coordination mode is called a distributed coordination mode.

Much further, the centralized coordination mode means that all the network functions or network components need to initiate a request to the B-type network coordinator when they run or operate the network elements or network configuration parameters, and the operations can be performed only after the B-type network coordinator responds. In the centralized coordination mode, the running result and parameter modification of the network function or network component all need to be reported to the B-type network coordinator. The distributed coordination mode means that mutual invoking of the network functions is performed directly, and uniform scheduling of the B-type network coordinator is not necessary, since there is no B-type network coordinator. In the distributed coordination mode, the network coordinator (specifically the A-type network coordinator) is equivalent to a switch for instructing whether to coordinate or not currently. Here, "not coordinate" means that the network coordinator doesn't work or function, the network functions or network groupwares can freely run and modify network configuration parameters, and in this case, network problems caused by the network functions or network groupwares, such as network conflict can be omitted.

In embodiments of the present invention, the B-type network coordinator or the A-type network coordinator can be a network function or a network groupware having a function of managing and scheduling a lower layer network function or network groupware. The B-type network coordinator or the A-type network coordinator pays more attention to management and scheduling functions, and may not engage in the network operations of the lower layer (such as COC, CCO, ANR, MRO or MLB).

In the system architecture diagram shown in FIG. 1, after the network coordination is initiated, in a case of the centralized coordination mode, the B-type network coordinator analyzes network condition, uniformly schedules the network functions or network groupwares, acquires the coordination suggestion of the network operations according to the analyzed network condition, and performs network operations on network resources, such as a cell and a base station.

Figure 2:
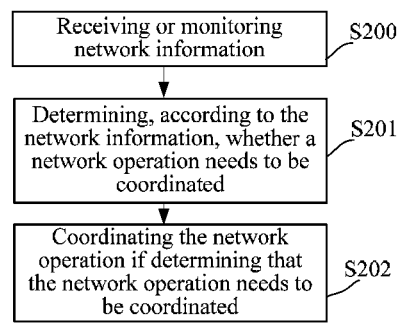
FIG. 2 is a schematic flow chart of a method for coordinating a network according to an embodiment of one aspect of the present invention.

As shown in FIG. 2, an embodiment of one aspect of the present invention provides a method for coordinating a network. The method for coordinating the network according to embodiments of the present invention is based on the system architecture provided by embodiments of the present invention shown in FIG. 1, and the method includes the content as follows. The entity for executing the method in this embodiment can be a network coordinator (such as, an SON coordinator), and the network coordinator can be a B-type network coordinator (such as, a B-type SON coordinator), or can be an A-type network coordinator (such as, an A-type SON coordinator).

S200, Receiving or monitoring network information.

Optionally, the network information includes, but not limited to, one or a combination of the information as follows:

a key performance indicator KPI, alarm monitoring information, a terminal failure report, terminal measurement data information, performance measurement information, minimum drive test information, user complaints, a network operation request and radio link failure information.

One or a combination of the above network information can trigger the network coordinator to determine whether the network operation needs to be coordinated. For example, when the network operation doesn't satisfy the expected objective of the current network (specifically, KPI doesn't satisfy the preset condition, or alarm monitoring information issues alarm information, or the user complaints indicate reduction of the current user experience, or radio link failure information is generated, or the network operation request indicates to perform the coordination of the network operation, and etc.), then the network coordinator determines that the network operation needs to be coordinated, so as to make the network operation satisfy the expected network objective as much as possible. Particularly, the network operation request includes a network operation request within the network and a network operation request issued manually, and the latter generally has a higher priority. If the network information received or monitored by the network coordinator includes the network operation request issued manually, it can be determined immediately that the current network operation needs to be coordinated, rather than determining whether the network operation needs to be coordinated by taking other network information into account.

As an example, a network coordinator can receive or monitor the network information described above. Since the network coordinator can be stand-alone in various network elements or network management systems, or can be within various network elements or network management systems, the entity for executing the method according to an embodiment of the present invention shown in FIG. 2 can be an access network device (such as a base station, a base station controller and a relay station), or a core network device (such as a mobility management entity, various gateways) or a user terminal, etc. The network coordinator can receive or monitor the network information via the existing interface (such as, an X2 interface between two base stations, an S1 interface between a base station and a mobility management entity, an air interface between a user terminal and a base station, a northbound interface between two network management systems, and etc.), or can receive or monitor the network information via a self-defined interface.

S201, Determining whether a network operation needs to be coordinated according to the network information.

Optionally, in embodiments of the present invention, the network coordinator determines, according to the network information, that the network operation needs to be coordinated, which includes one or a combination of the cases as follows:

analyzing, according to the network information, that a conflict exists in the network operation;

analyzing, according to the network information, that the network operation includes a plurality of network operations needing to be invoked.

In embodiments of the present invention, the network operation (such as the SON operation) includes the process of achieving one or more network functions or network groupwares. There are two types of coordination problems for coordinating the network operation:

The first type of coordination problem is resource conflict coordination (that is, a conflict exists in the network operation). That is to say, the conflict is caused by simultaneously or successively performing network operations (specifically, in the process of achieving a network function or a network groupware) on the same network resources, such as parameters, cells, base stations or antennas.

The second type of coordination problem is that multiple network operations running successively needs to be scheduled when the network operation includes multiple network operations to be invoked, so as to guarantee that KPI is not deteriorated by the network operations running successively. As different network operations have different network objectives (such as different KPIs), during the running, there may be the case that: a certain KPI indicator is improved after the previous network operation runs, but when the latter network operation runs, since respective network objectives are different, the KPI indicator of the latter is improved meanwhile the previous improved KPI indicator is reduced, therefore, the achieved effect after multiple network operations is not better than that of one network operation. For the second type of coordination problem, there is a need to rank objectives achieved by multiple network operations, monitor KPIs, and terminate the network operation causing the deteriorated effect in time or roll the network back to that before performing this network operation.

Much further, types of KPIs in embodiments of the present invention include KPIs of switching, coverage, load, service quality, and so on. Different types of KPIs correspond to different types of network problems, and the corresponding analyzing processes are also different.

The conflict in embodiments of the present invention is generated by one or a combination of the factors as follows:

operating areas of the network operation are the same, operation objects are the same, operating areas are neighbor cells/neighbor stations for each other, operation objects are neighbor cells/neighbor stations for each other, operating parameters are the same, operating parameters have fixed relationship, operating interval duration of the network operation is within the conflict time period, and etc.

Optionally, the network operation in embodiments of the present invention can be a network operation within a network, or a network operation issued manually. The network operation issued manually often has the highest priority. If the network coordinator determines that the current network operation includes a network operation issued manually, the network coordinator preferentially performs the network operation issued manually rather than determining whether the current network operation needs to be coordinated. After the network operation issued manually is completed, the network coordinator can determine, according to the network information, whether the current network operation needs to be coordinated, if the current network operation does not include a network operation issued manually.

S202, Coordinating the network operation if determining, according to the network information, that the network operation needs to be coordinated.

The network coordinator acquires a network coordinating suggestion when coordinating the network operation, and the coordinating suggestion is the preset coordinating suggestion of the operator, or the analytic coordinating suggestion determined after analyzing the network information.

As an example, in terms of the first type of coordination problem or the second type of coordination problem, the network coordinator can initiate network analysis flow with respect to the specific network operation (for example, initiate switching KPI analysis flow, if the current network operation conflict is of network switching), schedule mutual invoking or invoking sequence of each network operation, so that the network operation no longer conflicts and the expected objective of the network can be achieved. Particularly, the process of initiating the network analysis flow can be performed in a simulated environment, or in a practical network environment.

Applying the technical solutions according to embodiments of the present invention, whether a network operation needs to be coordinated is determined according to the received or monitored network information, thus the network operation can be coordinated in time, so that the probability of occurrence of various network problems due to that a network operation is fixed or is preset by an operator can be avoided as much as possible, so as to achieve an expected network objective, thereby reduce the maintenance cost of the operator.

Figures 1, 3:
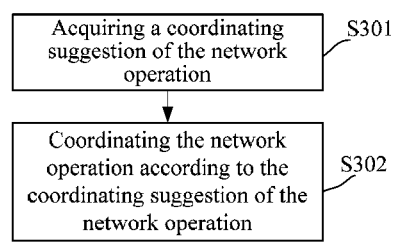
Figures 2, 3:
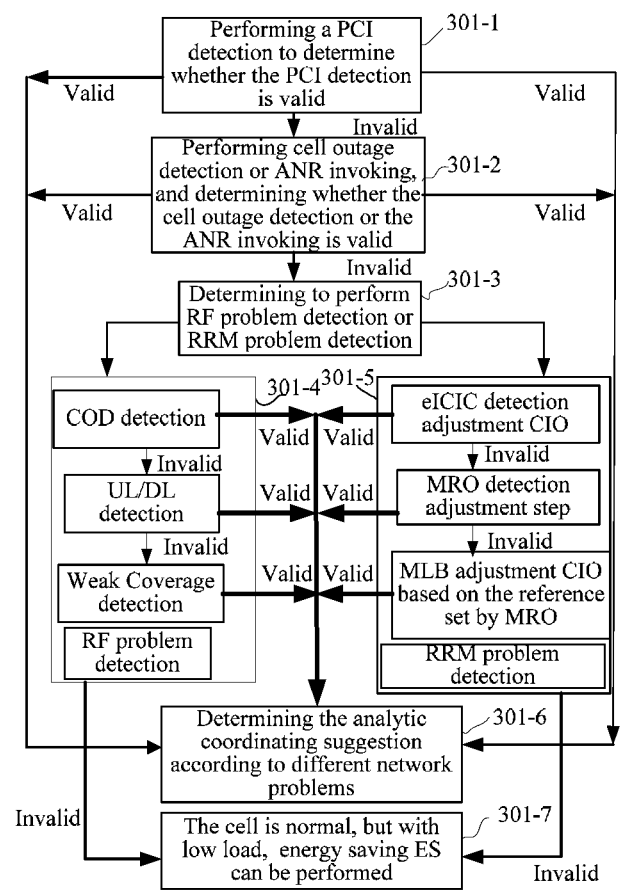

As shown in FIG. 3-1, an embodiment of another aspect of the present invention provides a method for coordinating a network. The method for coordinating the network according to this embodiment is a specific refinement for the embodiment shown in FIG. 2. No details about the same steps and concepts with the embodiment shown in FIG. 2 will be given here. The method according to this embodiment includes the content as follows.

As an example, this embodiment is refinement and extension of S202 in FIG. 2, as shown in FIG. 3-1, the "coordinating the network operation" includes:

S301, Acquiring a coordinating suggestion of the network operation.

Optionally, the network coordinator determines whether it is the first type of coordination problem or the second type of coordination problem, and accordingly determines the coordinating suggestion of the network operation.

Optionally, the coordinating suggestion of the network operation includes, but not limited to:

a preset coordinating suggestion of an operator; and/or an analytic coordinating suggestion determined after analyzing the network information.

The preset coordinating suggestion of the operator is a coordinating suggestion of the network operation determined by the operator in terms of different first type of coordination problems or different second type of coordination problems. The preset coordinating suggestion of the operator can be configured during network deployment, or can be preset by a network manager or a network element before performing the network operation. The network coordinator can use the preset coordinating suggestion of the operator purposefully according to the first type of coordination problem or the second type of coordination problem. If the coordinating suggestion of the network operation includes only the preset coordinating suggestion of the operator, then the network coordinator can directly use the preset coordinating suggestion of the operator, with no need to further analyze according to the first type of coordination problem or the second type of coordination problem.

Optionally, the network coordinator also can analyze the network information, so as to determine the analytic coordinating suggestion, as shown in FIG. 3-2, which includes:

S301-1, Performing physical cell identifier (PCI) detection to determine whether the PCI conflict detection is invalid.

S301-2, Performing neighbor missing detection or ANR invoking if determining that the PCI conflict detection is invalid, and determining whether the neighbor missing detection or the ANR invoking is invalid. If the PCI conflict detection is determined as valid, then the network coordinating suggestion can instruct the network coordinator to invoke the network functions or network groupwares for solving the PCI conflict detection.

S301-3, Performing radio frequency RF problem detection or radio resource management RRM problem detection, if determining that the neighbor missing detection or the ANR invoking is invalid. If the neighbor missing detection or the ANR invoking is determined as valid, then the network coordinating suggestion can instruct the network coordinator to invoke the network functions or network groupwares for solving the neighbor missing detection or the ANR invoking.

S301-3, The SON network coordinator determines, according to KPI, to perform RF problem detection or RRM problem detection, if determining that the neighbor missing detection or the invoking ANR is invalid.

S301-4, Performing RF problem detection. If the RF problem detection is valid, the coordinating suggestion is customized according to the RF problem.

S301-5, Performing RRM problem detection. If the RRM problem detection is valid, the coordinating suggestion is customized according to the RRM problem.

S301-6, Determining the analytic coordinating suggestion according to different network problems in S301-1 to S301-5. For example, if COD detection is valid, then invoke COD function in the network functions; if COD detection is invalid, then other RF problem detection or RRM problem detection still needs to be performed.

S301-7, if neither of the RRM problem detection (such as, eICIC detection adjustment CIO, MRO detection adjustment step and MLB adjustment CIO based on the reference set by MRO) and the RF problem (such as, COD detection, UL/DL detection and Weak Coverage detection) is valid, then it is indicated that the detected cell is normal, but with low load, so energy saving can be performed.

As an example, the RF problem detection includes one or a combination of the following:

COD detection, UL/DL detection and Weak Coverage detection.

As an example, the RRM problem detection includes one or a combination of the following:

eICIC detecting adjusting CIO, MRO detection adjusting step and MLB adjusting basic CIO on the reference set by MRO.

S302, Coordinating the network operation according to the coordinating suggestion of the network operation.

An example in embodiments of the present invention, includes:

The SON coordinator determines whether the reduction of KPI data in the network information is caused by severe cell outage problem of the network coverage (for example, KPI does not satisfy the preset conditions). The SON coordinator obtains whether COD is invalid by analyzing several KPI data (such as, success rate of cell access/handover, cell throughput, number of cell users), and analyzing and processing alarm and trace (Trace) information.

If the SON coordinator obtains that the COD detection is valid, then the coordinating suggestion of the network operation includes invoking SON functions or SON groupwares for solving the COD problem, which can be preset.

If the COD detection is invalid, that is, cell outage does not occur, then the SON coordinator performs other detection (such as, UL/DL detection and Weak Coverage detection). It should be noted that, the sequence of performing COD detection, UL/DL detection and Weak Coverage detection is not limited. If the SON coordinator finds a certain detection is valid when performing this detection, then the analytic coordinating suggestion includes SON functions or SON groupwares for solving the problem corresponding to this detection. For example, if COD detection is found to be valid, then the analytic coordinating suggestion indicates that the COD function needs to be invoked to solve the COD detection problem. SON functions or SON groupwares for solving the above problems are the same as those in the prior art, and no details will be given here.

In another example in embodiments of the present invention, if the COD detection is invalid, the SON coordinator performs UL/DL detection. The SON coordinator collects uplink and downlink terminal measurement data, MDT measurement report, radio link failure measurement report, RRM measurement report, uplink and downlink performance measurement information, and time stamp related to the cell with abnormal KPI data, and determines whether uplink and downlink coverage imbalance of the cell occurs. If uplink and downlink imbalance occurs, then the coordinating suggestion includes invoking SON functions or SON groupwares for solving the problem. If uplink and downlink imbalance does not occur, then verify whether the coverage scenario is weak coverage, over-coverage or pilot pollution. The SON coordinator collects terminal measurement data or MDT measurement report (especially measurement report triggered by A2 or A3 event), and determines whether there is larger interference between neighbor cells, and an event with a smaller signal difference. If there is larger interference between neighbor cells, then the coordinating suggestion includes SON functions or SON groupwares for solving the problem, which can be preset. If neither of the above detection (including all the RF and RRM problems) is valid, the cell is normal with light load. The coordinating suggestion can include a suggestion of no coordination, that is, do not coordinate the network operation.

In embodiments of the present invention, the network coordinator can determine, according to the network information, whether one or a combination of the following conditions is satisfied, and determine whether the detection is invalid: KPI improvement (such as, in terms of access success rate and handover success rate and the like, KPI raises or KPI is greater than a certain preset threshold; in terms of call failure rate, connection failure retry rate and call delay and the like, KPI falls or KPI is less than a certain preset threshold), alarm reduction or elimination, terminal measurement data improvement (such as, reduction of measurement value of reference signal power, reference signal quality or signal to noise ratio is greater than historical reduction) and radio link failure report reduction or elimination and etc.

Further, before coordinating the network operation, the method for coordinating the network according to embodiments of the present invention further includes:

making network coordination preparation for the network operation, so as to coordinate the network operation after the network coordination preparation;

where, the network coordination preparation includes one or a combination of the processes as follows:

acquiring deployment information, status information and influence range information of a network function or a network groupware in the network operation (for example, SON functions or SON groupwares are deployed in which network element or network management device, what kinds of SON functions or SON groupwares are deployed in the network element or network management device; whether the states of SON functions or SON groupwares are available; influence areas of SON functions or SON groupwares, tracking area/location area/routing area, influenced network element);

acquiring fixed relationship of the network groupware in the network operation (such as, invoking sequence of the functions in the network groupware, parameter transferred between network functions in the network groupware, priority of network functions in the network groupware, the choice made between network functions in the network groupware which are mutually exclusive events, or triggering condition of invoking network functions in the network groupware);

setting a coordination mode of the network operation for the network function or the network groupware in the network operation (such as a centralized coordination mode or a distributed coordination mode);

stopping a conflicting network function among network functions or a conflicting network groupware among network groupwares in the network operation.

The network coordinator can make the network coordination preparation, and the network coordination preparation is completed before the network operation is coordinated. Much further, when making the network coordination preparation, the network coordinator also can set a running switch of the network function, pre-store network configuration parameters, or call back running results, etc. The network coordinator also can set mutual relationship of the network functions, which can be associated by identification.

Much further, when making the network coordination preparation, the network coordinator first prohibits to run the network function or the network groupware for performing the coordination of the network operation, so as to keep stability of network environment, to prevent a network operation from running independently without scheduling of the network coordinator during the coordination of the network operation, which may cause a failure of the coordination, and to reset the scheduling sequence after adjusting the coordinating suggestion of the network operation. The network coordinator can acquire an association relationship or a running strategy of the network operations via the network coordination preparation, and prohibit the network operations associated with each other; the network operations without the association relationship do not need to be scheduled by the network coordinator.

As an example, the coordination mode of the network operation, including the centralized coordination mode and the distributed coordination mode, can be set in the network coordination preparation. Correspondingly, in a case of the centralized coordination mode, all the network operations are uniformly scheduled by the B-type SON coordinator, to achieve the network objectives. While in a case of the distributed coordination mode, the A-type SON coordinator can modify network configuration and schedule the network operation.

As an example, the coordinating suggestion in embodiments of the present invention includes one or a combination of the following: invoking of the network operation (such as, CCO-ANR adjustment, or ANR-CCO optimization), invoking sequence, invoking parameter, invoking priority information and duration of the network operation.

Figure 4:
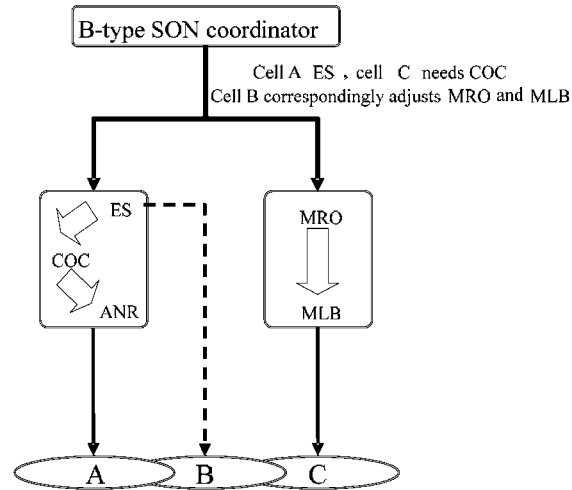
FIG. 4 is a schematic diagram of a method for coordinating a network according to an embodiment of another aspect of the present invention.

In view of the above, a specific example is given in the centralized coordination mode. FIG. 4 shows a method for coordinating a network according to an embodiment of another aspect of the present invention, and the method includes the processes as follows:

The B-type SON coordinator makes the network coordination preparation, and receives or monitors network information including KPI of cell B.

The B-type SON coordinator monitors that KPI of cell B decreases, for example, throughput decreases a lot, and access success rate is high, cell B will initiate a request to the B-type SON coordinator for entering an ES function. When cell B requests to enter the ES, the B-type SON coordinator first prevents cell B entering the ES state immediately, and meanwhile prohibits network operations of cells related to cell B, for example, SON operations of neighbor cells A and C.

The B-type SON coordinator performs neighbor cell detection and PCI conflict detection for cell B to determine whether neighbor cell outage occurs or an unknown neighbor cell exists.

If not, and KPI satisfies a preset threshold (such as KPI<<80%), then the B-type SON coordinator initiates COD detection to determine whether cell B is invalid, and in this case, minimum drive test information, radio link failure information, alarm information and information related to cell B need to be used for analyzing.

If cell B is not invalid, then allow cell B to enter the ES. Meanwhile, coordinate neighbor cells of cell B, i.e., cell A and cell C, and select one or two of the neighbor cells to compensate for coverage of cell B, for example, by activating COC function of cell A and cell C.

Activate ANR function of cell A and cell C, and adjust neighbor relationship.

Coordinate MRO groupware (MRO→MLB) to optimize a new handover relationship of the cell A and cell C with updated neighbor relationship, the final MLB can make cell A and cell C disperse services evenly when a new coverage is guaranteed after cell B enters the energy saving.

In the embodiment of the present invention, when the coordinating suggestion includes the preset coordinating suggestion of the operator and the analytic coordinating suggestion determined after analyzing the network information, determine whether there is a conflict between the preset coordinating suggestion of the operator and the analytic coordinating suggestion given after analyzing the network information.

If there is not a conflict, adjust the network operations according to the coordinating suggestion of the network operation.

If there is a conflict between the preset coordinating suggestion of the operator and the analytic coordinating suggestion determined after analyzing the network information, adjust the above coordinating suggestion to obtain an adjusted coordinating suggestion of the network operation. In terms of network functions or network groupwares which cannot run simultaneously, if they have already run, they needs to be terminated; in terms of network functions or network groupwares which need to be coordinated to run successively or simultaneously, if they are in a closed or a running-disable state, they needs to be initiated to run.

Much further, the preset network operation coordinating suggestion of the operator can designate which KPIs correspond to which network functions or network groupwares for coordination optimization, and there may be one or more. There may also be a conflict between the one or more preset coordinating suggestions of the operator, and thus, when the coordinating suggestions are to be adjusted, determine first whether there is a conflict between these preset coordinating suggestions, and then adjust. There may be one or more analytic coordinating suggestions determined after analyzing the network information, when the coordinating suggestions are to be adjusted, determine first whether there is a conflict between these coordinating suggestions, and then adjust.

In particular, the conflict can be generated by one or a combination of the factors as follows:

operating areas of the network operation are the same, operation objects are the same, operating areas are neighbor cells/neighbor stations for each other, operation objects are neighbor cells/neighbor stations for each other, operating parameters are the same, operating parameters have fixed relationship, operating interval duration of the network operation is within the conflict time period, and network operations are invoked simultaneously, and etc.

For example, in case that the operation objects of the network operations are the same cell, the cell has a certain number of neighbor cells, it is assumed that the cell has 32 neighbor cells altogether in three layers around the cell, or has several neighbor cells in a certain path and a certain direction, when the network operations are performed on the cell or these neighbor cells, the conflict occurs.

For another example, when certain network operations invoke other network operation, the same network function or network groupware or associated network functions or network groupwares (specifically SON functions or SON groupwares) may be invoked, then it is considered that the conflict occurs between these network operations. Much further, since certain network functions or network groupwares are not independent from one another in a practical network, the invoking of a certain network function or network groupware may affect other network functions or network groupwares associated therewith. Therefore, when determining whether a conflict exists in the network operation, if a conflict between the network operation and other network operation is determined, then network operation associated therewith is also considered to be a conflicting network operation. If there is a conflicting network operation between the preset coordinating suggestion and the analytic coordinating suggestion, the above coordinating suggestion should be adjusted, and the preset coordinating suggestion and the analytic coordinating suggestion are arbitrated, so that the adjusted coordinating suggestion can avoid the conflict of the network operation as much as possible. The adjustment can depend on a built-in logic or a preset strategy, which can include threshold determining, priority determining, weighted value ranking and so on.

As an example, the network coordinator assigns different priorities for the coordinating suggestions of different network operations when acquiring the coordinating suggestion of the network operation. When there is a conflict between network operations in the preset coordinating suggestion and the analytic coordinating suggestion, the network coordinator adjusts the coordinating suggestions of the network operations according to the priority. For example, in terms of the conflicting coordinating suggestions, exclude the coordinating suggestion with a lower priority and select the coordinating suggestion with the highest priority as the adjusted coordinating suggestion of the network operation. Or the adjusted coordinating suggestion is as comprehensively scheduling the network operation according to the priority of the coordinating suggestion or the weighted value ranking, so as to make the network operation satisfy the requirements for achieving the network objectives as much as possible. Much further, the coordinating suggestion of the network operation also can be issued manually to the network coordinator, and generally, the coordinating suggestion of the network operation issued manually often has the highest priority, and then, the network coordinator preferentially performs the coordinating suggestion of the network operation issued manually rather than using the preset coordinating suggestion and the analytic coordinating suggestion.

Optionally, the method according to embodiments of the present invention also can include:

before coordinating the network operation, saving configuration parameters under different network environments and network performance values under the different network environments, and assigning different serial numbers or step numbers or sequence numbers for the different network environments;

rolling back to the network before coordinating the network operation, according to the serial numbers or step numbers or sequence numbers of the different network environments, the configuration parameters under different network environments and the network performance values under the different network environments.

The network coordinator saves configuration parameters under different network environments and network performance values under the different network environments, so that the network coordinator can roll back to the network before coordinating the network operation, if KPI is deteriorated or the coordinating suggestion needs to be determined again after the network coordination is performed according to the coordinating suggestion of the network operation or the adjusted coordinating suggestion of the network operation. When the network coordinator saves configuration parameters under different network environments and network performance values under the different network environments, and coordinates the network operation, there may be a need to perform coordination of the network operation for several times due to that the requirements for achieving the network objectives may change or the optimal network objective needs to be achieved. Therefore, the network coordinator can assign different serial numbers or step numbers or sequence numbers for the different network environments when saving configuration parameters under different network environments and network performance measurement values under the different network environments, so that the network coordinator can accurately roll back to the network before the network coordination with a certain serial number or step number or sequence number, or even a certain specific network operation, when there is a need to roll back the network. Here, the serial number or step number or sequence number can be ranked according to the time sequence of the network operations, or can be a preset index number, and can respectively correspond to different network environments or different network operations.

Figure 5:
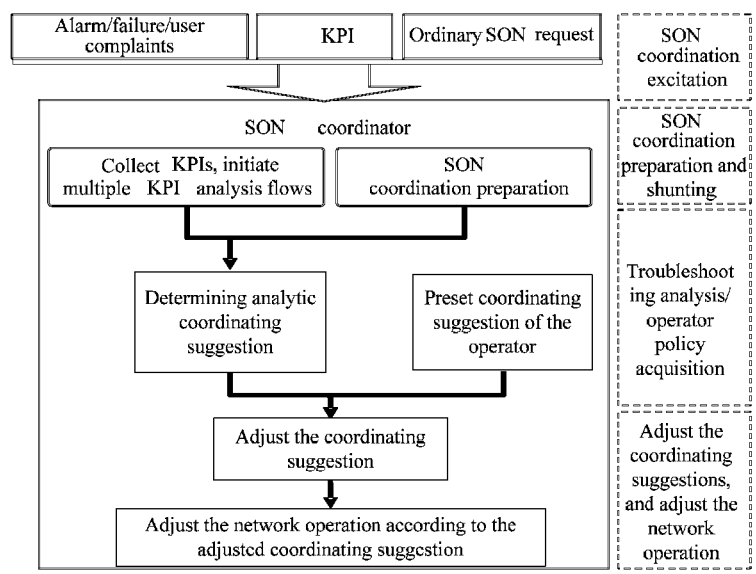
FIG. 5 is another schematic diagram of a method for coordinating a network according to an embodiment of another aspect of the present invention.

As another specific example, as shown in FIG. 5, the method according to embodiments of the present invention includes:

SON coordination excitation

The SON coordinator receives alarm/failure/user complaints, KPI, or an SON request, and such information indicates that the network operation needs to be coordinated.

(2) SON coordination preparation and shunting

The SON coordinator makes coordination preparation of the network operation. After the coordination preparation of the network operation is completed, the SON coordinator collects KPIs (such as, KPIs of switching, coverage and load) related to the network operation, and initiates different KPI analysis according to different KPIs.

(3) Troubleshooting analysis/operator policy acquisition

The SON coordinator determines the analytic coordinating suggestion for different network problems according to the different KPI analysis; the SON coordinator acquires the preset coordinating suggestion of the operator for different network problems.

(4) If there is a conflict between the analytic coordinating suggestion and the preset coordinating suggestion of the operator, arbitrate the analytic coordinating suggestion and adjust the coordinating suggestion. The SON coordinator can adjust the network operation according to the adjusted coordinating suggestion, so that the adjusted coordinating suggestion can make the network operation avoid the conflict and satisfy the requirements for achieving the network objectives as much as possible.

Applying the technical solutions according to embodiments of the present invention, it can be known whether a network operation needs to be coordinated, and the network operation needing to be coordinated can be processed via coordination, so as to reduce the maintenance cost of the operator. And in the technical solutions according to embodiments of the present invention, determining the coordinating suggestion of the network operation and adjusting according to the determination result can reduce conflict in the network operation as much as possible, achieve the requirement of the network objective and reduce the maintenance cost of the network.

Another aspect of embodiments of the present invention provides an apparatus for coordinating a network, which corresponds to the method. For the concepts in the method embodiments, reference can be made to the description in the method embodiments, and no further details will be given here.

Figure 6:
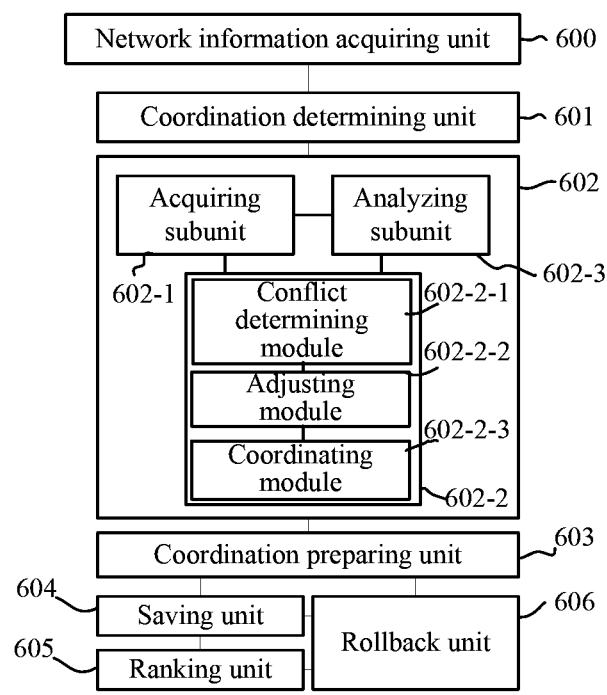
FIG. 6 is a schematic structural diagram of an apparatus for coordinating a network according to an embodiment of one aspect of the present invention.

As shown in FIG. 6, one aspect of embodiments of the present invention provides an apparatus, which corresponds to the method embodiment shown in FIG. 2, the apparatus includes:

a network information acquiring unit 600, configured to receive or monitor network information.

a coordination determining unit 601, configured to determine, according to the network information, whether a network operation needs to be coordinated; and a coordinating unit 602, configured to coordinate the network operation if the coordination determining unit 601 determines, according to the network information, that the network operation needs to be coordinated.

Optionally, the network information includes one or a combination of the parameters as follows:

a key performance indicator KPI, alarm monitoring information, a terminal failure report, terminal measurement data information, performance measurement information, minimum drive test information, user complaints, a network operation request and radio link failure information.

Optionally, the coordination determining unit is specifically configured to determine that the network operation needs to be coordinated in one or a combination of the cases as follows:

the coordination determining unit analyzes, according to the network information, that conflict exists in the network operation;

the coordination determining unit analyzes, according to the network information, that a plurality of network operations need to be invoked.

Much further, the apparatus according to embodiments of the present invention also can correspond to the method embodiment shown in FIG. 3-1, and the coordinating unit includes:

an acquiring subunit 602-1, configured to acquire a coordinating suggestion of the network operation;

a coordinating subunit 602-2, configured to coordinate the network operation according to the coordinating suggestion of the network operation.

Further, the acquiring subunit 602-1 is specifically configured to acquire a preset coordinating suggestion of an operator; and/or acquire a coordinating suggestion determined after analyzing the key performance indicator KPI.

The coordinating unit further includes:

an analyzing subunit 602-3, configured to analyze the network information and determine the analytic coordinating suggestion.

Further, the analyzing subunit 602-3 is specifically configured to perform PCI conflict detection to determine whether the PCI conflict detection is invalid; the analyzing subunit is specifically further configured to perform neighbor missing detection or ANR invoking if determining that the PCI conflict is invalid, and determining whether the neighbor missing detection or the ANR invoking is invalid; and the analyzing subunit is specifically further configured to perform radio frequency RF problem detection or radio resource management RRM problem detection if determining that the neighbor missing detection or the automatic neighbor relationship ANR invoking is invalid.

Optionally, the RF problem detection includes one or a combination of the following:

COD detection, UL/DL detection and Weak Coverage detection.

Optionally, the RRM problem detection includes one or a combination of the following:

eICIC detecting adjusting CIO, MRO detecting adjusting step and MLB adjusting basic CIO on the reference set by MRO.

Optionally, the apparatus further includes:

a coordination preparing unit 603, configured to make network coordination preparation for the network operation, so as to coordinate the network operation after the network coordination preparation;

where, the network coordination preparation includes one or a combination of the processes as follows:

acquiring deployment information, status information or influence range information of a network function in the network operation or a network groupware in the network operation;

acquiring fixed relationship of the network groupware in the network operation;

setting a coordination mode of the network operation for the network function in the network operation or the network groupware in the network operation;

stopping a conflicting network function among network functions in the network operation or a conflicting network groupware among network groupwares in the network operation.

Optionally, when the coordinating suggestion of the network operation includes the preset coordinating suggestion of the operator and the analytic coordinating suggestion determined after analyzing the network information, the coordinating subunit further includes:

a conflict determining module 602-2-1, configured to determine whether there is a conflict between the preset coordinating suggestion of the operator and the analytic coordinating suggestion;

an adjusting module 602-2-2, configured to adjust the coordinating suggestion of the network operation, when the conflict determining module determines there is a conflict between the preset coordinating suggestion of the operator and the analytic coordinating suggestion;

a coordinating module 602-2-3, configured to coordinate the network operation according to the adjusted coordinating suggestion of the network operation, after the adjusting module 602-2-2 adjusts the coordinating suggestion of the network operation.

Optionally, the conflict is generated by one or a combination of the factors as follows:

operating areas of the network operation are the same, operation objects are the same, operating areas are neighbor cells/neighbor stations for each other, operation objects are neighbor cells/neighbor stations for each other, operating parameters are the same, operating parameters have fixed relationship, operating interval duration of the network operation is within the conflict time period, and network operations are invoked simultaneously.

Optionally, the coordinating suggestion includes one or a combination of the following: invoking of the network operation, invoking sequence, invoking parameter, invoking priority information and duration of the network operation.

Optionally, the apparatus for coordinating the network according to embodiments of the present invention also can include:

a saving unit 604, configured to save configuration parameters under different network environments and network performance values under the different network environments, where, the network performance values include KPIs under different network environments, numbers of user terminals and numbers of handovers, network performance measurement values under the different network environments, and wireless signal measurement values under the different network environments;

a ranking unit 605, configured to assign different serial numbers or step numbers or sequence numbers for the different network environments;

a rollback unit 606, configured to roll back to the network before coordinating the network operation, according to the serial numbers or step numbers or sequence numbers for the different network environments, the configuration parameters under different network environments and the network performance values under the different network environments.

The apparatus according to embodiments of the present invention can be a network coordinator. The network coordinator can be included in various network elements or network management systems, or can be an IRPManager or an IRPManager. Therefore, the apparatus according to embodiments of the present invention can be a base station, a base station controller, a relay station, a core network device and a user terminal, and etc.

The apparatus according to embodiments of the present invention corresponds to the method embodiment, and thus is not limited to the above structural units, and a new structural unit also can be generated based on corresponding flow process, and no details will be given here. Further, the structural unit in the apparatus according to embodiments of the present invention can be stand-alone, or two or more of the units are integrated into one unit, and the present invention is not limited thereto. Much further, the network information acquiring unit 600, the coordination determining unit 601, the coordinating unit 602, the coordination preparing unit 603, the saving unit 604, the ranking unit 605 and the rollback unit 606 of the apparatus according to embodiments of the present invention can be included in a processor (such as a central processing unit (CPU), a digital signal processor (DSP), a field programmable gate array (FPGA) or other embedded chips), and the processor is used to perform the method for coordinating the network of the method embodiments shown in FIG. and FIG. 3. Correspondingly, the apparatus according to embodiments of the present invention also can include a memory, for storing codes of the method for coordinating the network of the method embodiments shown in FIG. 2 and FIG. 3. The processor and memory can be connected via a universal bus, or via a private interface, and the present invention is not limited thereto.

Applying the technical solutions according to embodiments of the present invention, it can be known whether a network operation needs to be coordinated, and the network operation needing to be coordinated can be processed via coordination, so as to reduce the maintenance cost of the operator.

Persons skilled in the art would appreciate that the various illustrative units and algorithm steps described in connection with the embodiments disclosed herein may be implemented as electronic hardware, computer software, or a combination of both. To clearly illustrate the interchangeability of hardware and software, various illustrative components and steps have been described above generally in terms of their functionalities. Whether such functionalities are implemented as hardware or software depends on particular applications and design restrictions of the technical solutions. Professional technicians may implement the described functions in varying ways for each particular application, but such implementations should not be interpreted as causing a departure from the scope of the present invention.

The steps of a method or algorithm described in connection with the embodiments disclosed herein may be embodied in hardware, in a software module executed by a processor, or in a combination of the two. The software module may reside in a random access memory (RAM), internal memory, read-only memory (ROM), electrically programmable ROM, electrically erasable programmable ROM, register, hard disk, removable disk, CD-ROM, or any other form of storage medium known in the art.

The objectives, technical solutions, and beneficial effects of the present invention have been described in further detail through the above specific embodiments. It should be understood that the above descriptions are merely specific embodiments of the present invention, but not intended to limit the protection scope of the present invention. Any modification, equivalent replacement, or improvement made under the spirit and principle of the present invention is included in the protection scope of the present invention.

What claim is:

1. A method for coordinating a network, comprising:
receiving or monitoring, by a processor of a network coordinator, network information, the network coordinator comprising the processor and a memory for storing codes of the method for coordinating the network, and the network coordinator is an access network device, a core network device or a user terminal;
determining, by the processor of the network coordinator and according to the network information, whether a network operation needs to be coordinated; and
coordinating, by the processor of the network coordinator, the network operation if determining, according to the network information, that the network operation needs to be coordinated; wherein the determining, according to the network information, that the network operation needs to be coordinated comprises: analyzing, according to the network information, that a first conflict exists in the network operation;
wherein the coordinating, by the processor of the network coordinator, the network operation comprises:
acquiring a coordinating suggestion of the network operation for solving the first conflict existing in the network operation; and
coordinating the network operation according to the coordinating suggestion of the network operation;
wherein the coordinating suggestion of the network operation comprises: a preset coordinating suggestion of an operator; and an analytic coordinating suggestion determined after analyzing the network information;
wherein the method further comprises:
determining, by the processor of the network coordinator, that there is a second conflict between the preset coordinating suggestion of the operator and the analytic coordinating suggestion;
adjusting, by the processor of the network coordinator, the coordinating suggestion of the network operation according to requirements for implementing the network operation; and
coordinating, by the processor of the network coordinator, the network operation according to the adjusted coordinating suggestion of the network operation; and
wherein the analyzing the network information comprises:
performing a physical cell identifier (PCI) conflict detection to determine whether the PCI conflict detection is invalid;
performing neighbor missing detection or automatic neighbor relationship (ANR) invoking if determining that the PCI conflict detection is invalid, and determining whether the neighbor missing detection or the ANR invoking is invalid; and
performing radio frequency RF problem detection or radio resource management (RRM) problem detection, if determining that the neighbor missing detection or the ANR invoking is invalid.

2. The method according to claim 1, wherein the determining, according to the network information, that the network operation needs to be coordinated further comprises:
  analyzing, according to the network information, that the network operation comprises a plurality of network operations needing to be invoked.

3. The method according to claim 2, wherein the conflict is generated by one or a combination of the factors as follows:
  operating areas of the network operation are the same, operation objects are the same, operating areas are neighbor cells/neighbor stations for each other, operation objects are neighbor cells/neighbor stations for each other, operating parameters are the same, operating parameters have fixed relationship and operating interval duration of the network operation is within the conflict time period.

4. The method according to claim 1, wherein the network information comprises one or a combination of the information as follows:
  a terminal failure report, terminal measurement data information, performance measurement information, minimum drive test information, user complaints, a network operation request and radio link failure information.

5. The method according to claim 1, wherein, before the coordinating the network operation, the method further comprises:
  making network coordination preparation for the network operation, so as to coordinate the network operation after the network coordination preparation; and
  wherein, the coordination preparation of the network operation comprises one or a combination of the processes as follows:
  acquiring deployment information, status information or influence range information of a network function or a network groupware in the network operation;
  acquiring fixed relationship of the network groupware in the network operation;
  setting a coordination mode of the network operation for the network function or the network groupware in the network operation; and
  stopping a conflicting network function among network functions in the network operation or a conflicting network groupware among network groupwares in the network operation.

6. The method according to claim 1, further comprising:
  before coordinating the network operation, saving configuration parameters under different network environments and network performance values under the different network environments, and assigning different serial numbers or step numbers or sequence numbers for the different network environments; and
  rolling back to the network before coordinating the network operation, according to the serial numbers or step numbers or sequence numbers of the different network environments, the configuration parameters under different network environments and the network performance values under the different network environments;
  wherein, the network performance values comprises KPIs under different network environments, number of user terminals and number of handovers, network performance measurement values under the different network environments, and wireless signal measurement values under the different network environments.

7. The method according to claim 1, wherein the coordinating suggestion comprises one or a combination of the following: invoking of the network operation, invoking sequence, invoking parameter, invoking priority information and duration of the network operation.

8. The method according to claim 4, wherein the network information further comprises at least one of a key performance indicator (KPI) and alarm monitoring information.

9. An apparatus for coordinating a network, comprising:
  a processor, configured to perform a method for coordinating a network; and
  a memory, configured to store codes of the method for coordinating a network;
  wherein the method comprises:
  receiving or monitoring network information;
  determining, according to the network information, whether a network operation needs to be coordinated; and
  coordinating the network operation if determining, according to the network information, that the network operation needs to be coordinated; wherein the determining, according to the network information, that the network operation needs to be coordinated comprises: analyzing, according to the network information, that a first conflict exists in the network operation;
  wherein the processor is specifically configured to acquire a coordinating suggestion of the network operation for solving the first conflict existing in the network operation; and coordinate the network operation according to the coordinating suggestion of the network operation;
  wherein the processor is specifically configured to acquire a preset coordinating suggestion of an operator; and acquire an analytic coordinating suggestion determined after analyzing the network information;
  wherein the processor is further configured to: determine that there is a second conflict between the preset coordinating suggestion of the operator and the analytic coordinating suggestion; adjust the coordinating suggestion of the network operation according to requirements for implementing the network operation; and coordinate the network operation according to the adjusted coordinating suggestion of the network operation; and
  wherein the processor is specifically configured to perform a physical cell identifier (PCI) conflict detection to determine whether the PCI conflict detection is invalid; the analyzing subunit is specifically further configured to perform neighbor missing detection or automatic neighbor relationship (ANR) invoking if determining that the PCI conflict detection is invalid, and determining whether the neighbor missing detection or the ANR invoking is invalid; and the analyzing subunit is specifically further configured to perform radio frequency (RF) problem detection or radio resource management (RRM) problem detection, if determining that the neighbor missing detection or the ANR invoking is invalid.

10. The apparatus according to claim 9, wherein the processor is specifically further configured to determine that the network operation needs to be coordinated in the case as follows:
  the coordination determining unit analyzes, according to the network information, that a plurality of network operations need to be invoked.

11. The apparatus according to claim 10, wherein the conflict is generated by one or a combination of the factors as follows:

operating areas of the network operation are the same, operation objects are the same, operating areas are neighbor cells/neighbor stations for each other, operation objects are neighbor cells/neighbor stations for each other, operating parameters are the same, operating parameters have fixed relationship and operating interval duration of the network operation is within the conflict time period.

12. The apparatus according to claim 9, wherein the network information comprises one or a combination of the information as follows:
   a terminal failure report, terminal measurement data information, performance measurement information, minimum drive test information, user complaints, a network operation request and radio link failure information.

13. The apparatus according to claim 9, wherein the coordinating suggestion comprises one or a combination of the following: invoking of the network operation, invoking sequence, invoking parameter, invoking priority information and duration of the network operation.

14. The apparatus according to claim 9, wherein the processor is specifically configured to analyze the network information and determine the analytic coordinating suggestion.

15. The apparatus according to claim 9, wherein the memory is further configured to store some code, and the processor is further configured to execute the code stored in the memory, so that before coordinating the network operation, the apparatus makes network coordination preparation for the network operation, so as to coordinate the network operation after the network coordination preparation; and
   wherein, the network coordination preparation comprises one or a combination of the processes as follows:
   acquiring deployment information, status information or influence range information of a network function or a network groupware in the network operation;
   acquiring fixed relationship of the network groupware in the network operation;
   setting a coordination mode of the network operation for the network function or the network groupware in the network operation; and
   stopping a conflicting network function among network functions in the network operation or a conflicting network groupware among network groupwares in the network operation.

16. The apparatus according to claim 9, wherein the memory is further configured to store some code, and the processor is further configured to execute the code stored in the memory, so that before coordinating the network operation, the apparatus is configured to:
   save configuration parameters under different network environments and network performance values under the different network environments, wherein, the network performance values comprises KPIs under different network environments, number of user terminals and number of handovers, network performance measurement values under the different network environments, and wireless signal measurement values under the different network environments; and
   assign different serial numbers or step numbers or sequence numbers for the different network environments; and
   roll back to the network before coordinating the network operation, according to the serial numbers or step numbers or sequence numbers of the different network environments, the configuration parameters under different network environments and the network performance values under the different network environments.

17. The apparatus according to claim 10, wherein the coordinating suggestion comprises one or a combination of the following: invoking of the network operation, invoking sequence, invoking parameter, invoking priority information and duration of the network operation.

18. The apparatus according to claim 12, wherein the network information further comprises at least one of a key performance indicator (KPI) and alarm monitoring information.

* * * * *